(12) United States Patent
Ishiyama et al.

(10) Patent No.: US 10,247,159 B2
(45) Date of Patent: Apr. 2, 2019

(54) RECOIL STARTER AND ENGINE

(71) Applicant: MITSUBISHI HEAVY INDUSTRIES MEIKI ENGINES CO., LTD, Nagoya-shi, Aichi (JP)

(72) Inventors: Akihiro Ishiyama, Tokyo (JP); Manabu Sekimukai, Tokyo (JP); Yasunaga Ooiwa, Tokyo (JP)

(73) Assignee: Mitsubishi Heavy Industries Meiki Engines Co., Ltd., Nagoya-shi, Aichi (JP)

( * ) Notice: Subject to any disclaimer, the term of this patent is extended or adjusted under 35 U.S.C. 154(b) by 0 days.

(21) Appl. No.: 15/754,134

(22) PCT Filed: Aug. 23, 2016

(86) PCT No.: PCT/JP2016/074485
§ 371 (c)(1),
(2) Date: Feb. 21, 2018

(87) PCT Pub. No.: WO2017/033918
PCT Pub. Date: Mar. 2, 2017

(65) Prior Publication Data
US 2018/0252194 A1 Sep. 6, 2018

(30) Foreign Application Priority Data

Aug. 24, 2015 (JP) .................. 2015-165120

(51) Int. Cl.
*F02N 3/02* (2006.01)
*F16D 41/12* (2006.01)
(Continued)

(52) U.S. Cl.
CPC ................. *F02N 3/02* (2013.01); *F02N 5/02* (2013.01); *F02N 15/027* (2013.01); *F16D 41/12* (2013.01);
(Continued)

(58) Field of Classification Search
CPC ....... F02N 3/02; F02N 15/027; F02N 2250/08
(Continued)

(56) References Cited

U.S. PATENT DOCUMENTS 6,363,901 B1  4/2002  Watanabe et al.
2004/0168668 A1  9/2004  Tsunoda et al.
(Continued)

FOREIGN PATENT DOCUMENTS

DE  102007020680 A1  11/2008
JP  59-16507 Y  5/1984
(Continued)

OTHER PUBLICATIONS

International Search Report dated Oct. 11, 2016 in Application No. PCT/JP2016/074485 with an English Translation.
(Continued)

*Primary Examiner* — Erick Solis
(74) *Attorney, Agent, or Firm* — Birch, Stewart, Kolasch & Birch, LLP (57) ABSTRACT

A recoil starter (103) includes a pull rope reel (22), a ratchet wheel (31), a pulley (32), a ratchet pawl (33), and an outer wall (32e). The ratchet pawl (33) is capable of swinging between an engaged position where the ratchet pawl engages with a protruding part (31a) and a disengaged position where the ratchet pawl does not engage with the protruding part, and is always urged toward the engaged position. A support surface (32d) of the outer wall (32e) supports the base end portion of the ratchet pawl (33) when the ratchet pawl (33) is in the engaged position. The internal space of the pulley (32) and the external space of the pulley (32) are communicate with each other through the foreign matter discharge portion (32f) of the outer wall (32e).

16 Claims, 6 Drawing Sheets

(51) Int. Cl.
*F02N 5/02* (2006.01)
*F16H 33/02* (2006.01)
*F16D 43/16* (2006.01)
*F02N 15/02* (2006.01)

(52) U.S. Cl.
CPC .............. *F16D 43/16* (2013.01); *F16H 33/02* (2013.01); *F02N 15/026* (2013.01)

(58) Field of Classification Search
USPC ...................................................... 123/185.3
See application file for complete search history.

(56) References Cited

U.S. PATENT DOCUMENTS

| | | |
|---|---|---|
| 2005/0051124 A1 | 3/2005 | Adam et al. |
| 2008/0271698 A1* | 11/2008 | Zimmermann ........... F02N 3/02 |
| | | 123/185.2 |

FOREIGN PATENT DOCUMENTS

| | | |
|---|---|---|
| JP | 59-162362 A | 9/1984 |
| JP | 60-030361 U | 3/1985 |
| JP | 60-120271 U | 8/1985 |
| JP | 61-27971 U | 2/1986 |
| JP | 6-14568 U | 2/1994 |
| JP | 7-54739 A | 2/1995 |
| JP | 11-117835 A | 4/1999 |
| JP | 2004-150407 A | 5/2004 |
| JP | 2004-263615 A | 9/2004 |
| JP | 4138455 B2 | 8/2008 |

OTHER PUBLICATIONS

Written Opinion dated Oct. 11, 2016 in Application No. PCT/JP2016/074485 with an English Translation.

\* cited by examiner

RECOIL STARTER AND ENGINE

TECHNICAL FIELD

The present invention relates to a recoil starter and an engine.

Priority is claimed on Japanese Patent Application No. 2015-165120, filed Aug. 24, 2015, the content of which is incorporated herein by reference.

BACKGROUND ART

A general-purpose small internal combustion engine (hereinafter simply referred to as an engine) often includes a recoil starter for starting the engine. The recoil starter rotates a crankshaft of the engine to start by quickly and greatly pulling a pull rope with a grip provided at a tip.

The aforementioned recoil starter generally includes a pull rope reel and a ratchet, as main components. A pull rope is wound around the pull rope reel. The pull rope reel converts linear motion of pulling the pull rope into rotational motion. The pull rope reel is equipped with a pull rope winding mechanism such as a rolling spring, and it is possible to easily store the pulled pull rope.

The ratchet transmits the rotation of the pull rope reel to the crankshaft of the engine when pulling out the pull rope. The ratchet is mainly equipped with a ratchet pawl and a ratchet wheel.

The ratchet pawl is disposed on a radially outer side of the ratchet wheel. The ratchet pawl is able to swing between an engaged position where the ratchet pawl engages with a protrusion provided on the outer peripheral portion of the ratchet wheel and a disengaged position where the ratchet pawl does not engage with the protrusion. The ratchet pawl is always urged toward the engaged position side by a spring or the like, and, for example, when the engine is stopped, the ratchet pawl is disposed at the engaged position. On the other hand, when the engine is started and reaches a sufficient engine speed, the ratchet pawl swings in the direction of resisting the urging force by the centrifugal force of the rotation, and is displaced to the disengaged position.

A reaction force from the ratchet wheel acts on the ratchet pawl at the time of starting the engine. When it is attempted to secure sufficient strength against the reaction force of the ratchet wheel, the size of the swinging shaft of the ratchet pawl increases, and the size of the recoil starter itself increases.

Patent Document 1 discloses a recoil starter in which an outer wall for supporting a reaction force from a ratchet wheel is formed outside a base portion of a ratchet pawl. In this way, when the ratchet transmits rotation to the crankshaft, the reaction force received by the ratchet pawl can be supported not only by the swinging shaft but also by the outer wall on the base portion side of the ratchet pawl.

CITATION LIST

Patent Literature

Patent Document 1

Japanese Unexamined Patent Application, First Publication No. 2004-263615

SUMMARY OF INVENTION

Technical Problem

In some cases, the aforementioned recoil starter may be disposed in the vicinity of an inlet port that introduces the cooling air of the engine from the outside. Foreign matter such as sand grains is mixed in the cooling air introduced through the inlet port. When the foreign matter is mixed in the cooling air as in the above, there is a possibility that foreign matter enters a gap between the ratchet pawl and the outer peripheral wall, a gap of the spring mechanism of the ratchet pawl, or the like, and a malfunction occurs in the ratchet pawl. When the malfunction occurs in the ratchet pawl in this way, maintenance such as disassembly and cleaning becomes necessary because the engine cannot be started.

The purpose of the present invention is to provide a recoil starter and an engine capable of suppressing the malfunction of a ratchet pawl to reduce the frequency of maintenance such as disassembly and cleaning.

Solution to Problem

According to a first aspect of the present invention, a recoil starter includes a pull rope reel, a ratchet wheel, a pulley, a ratchet pawl, and an outer wall. A pull rope is wound around the pull rope reel, and the pull rope reel rotates by pulling out the pull rope. The ratchet wheel rotates with the rotation of the pull rope reel. The ratchet wheel has a protruding part protruding toward a radially outer side of a rotation axis. The pulley is rotatable coaxially with the ratchet wheel. The ratchet pawl is supported on the pulley on the radially outer side of the ratchet wheel. The ratchet pawl is capable of swinging between an engaged position where the ratchet pawl engages with the protruding part and a disengaged position where the ratchet pawl does not engage with the protruding part. The ratchet pawl is always urged toward the engaged position. The outer wall is provided on the pulley. The outer wall has a support surface and a foreign matter discharge portion. The support surface supports a base end portion of the ratchet pawl from a side opposite to the tip portion of the ratchet pawl across a swinging axis of the ratchet pawl when the ratchet pawl is in the engagement position. The internal space of the pulley on which the ratchet pawl is disposed communicates with the external space of the pulley through the foreign matter discharge portion.

With such a configuration, even when foreign matter such as sand grains contained in the cooling air for the engine enters the internal space of the pulley, foreign matter entering the internal space of the pulley can be discharged to the external space of the pulley via the foreign matter discharge portion by the centrifugal force due to the rotation of the pulley. Therefore, it is possible to suppress foreign matter from entering a gap of a mechanism for urging the ratchet pawl, a gap between the ratchet pawl and the support surface, or the like, and from being caught in the gap.

As a result, it is possible to suppress the malfunction of the ratchet pawl and to reduce the frequency of maintenance such as disassembly and cleaning.

A second aspect of the present invention provides the recoil starter according to the first aspect, and an opening portion on the internal space side of the foreign matter discharge portion of the recoil starter may be formed in at least the support surface.

With such a configuration, even when the foreign matter enters the gap between the ratchet pawl and the support surface, the foreign matter entering this gap can be discharged to the outside of the pulley via the opening portion of the foreign matter discharge portion formed in the support surface. As a result, it is possible to prevent the occurrence of catching caused by foreign matter entering between the ratchet pawl and the support surface, and to further reduce the maintenance frequency.

A third aspect of the present invention provides the recoil starter according to the second aspect, and the opening portion may be formed in an angular range of the support surface between a straight line passing through the center of the ratchet pawl in the disengaged position and a straight line passing through the rotation axis of the pulley and the swinging axis of the ratchet pawl.

With such a configuration, even when foreign matter enters the gap between the ratchet pawl and the support surface, the foreign matter entering the gap during swinging of the ratchet pawl is discharged to the outside of the pulley via the foreign matter discharge portion. As a result, foreign matter can be efficiently discharged by a small number of foreign matter discharge portions.

A fourth aspect of the present invention provides the recoil starter according to any one of the first to third aspects, and the foreign matter discharge portion of the recoil starter may be formed by penetrating the pulley in the radial direction around the rotation axis of the pulley.

With this configuration, the direction of the centrifugal force exerted by the rotation of the pulley and the direction of the penetration of the foreign matter discharge portion can be made to coincide with each other. As a result, foreign matter can be smoothly discharged to the outside of the pulley by centrifugal force.

A fifth aspect of the present invention provides the recoil starter according to any one of the first to fourth aspects, and the foreign matter discharge portion of the recoil starter may be formed in a slit shape extending in the rotation axis direction of the pulley.

With this configuration, it is possible to discharge foreign matter in a wide range of the rotation axis direction of the pulley. As a result, it is possible to reduce the foreign matter remaining in the internal space of the pulley.

A sixth aspect of the present invention provides the recoil starter according to any one of the first to fifth aspects, and the foreign matter discharge portion of the recoil starter may extend to the outside of the ratchet pawl in the rotation axis direction of the pulley.

With this configuration, the opening portion of the foreign matter discharge portion can be formed in the entire region of the region in which the ratchet pawl is present in the rotation axis direction of the pulley. As a result, it is possible to further suppress the foreign matter from remaining in the gap between the ratchet pawl and the support surface.

A seventh aspect of the present invention provides an engine including the recoil starter according to any one of the first to sixth aspects.

With such a configuration, since it is possible to reduce the situation in which the engine cannot be started due to the malfunction of the recoil starter, reliability can be improved.

Advantageous Effects of Invention

According to the aforementioned recoil starter and the engine, it is possible to suppress the malfunction of the ratchet pawl and to reduce the frequency of maintenance such as disassembly and cleaning.

DESCRIPTION OF EMBODIMENTS

Next, a recoil starter and an engine according to an embodiment of the present invention will be described with reference to the drawings.

Figure 1:
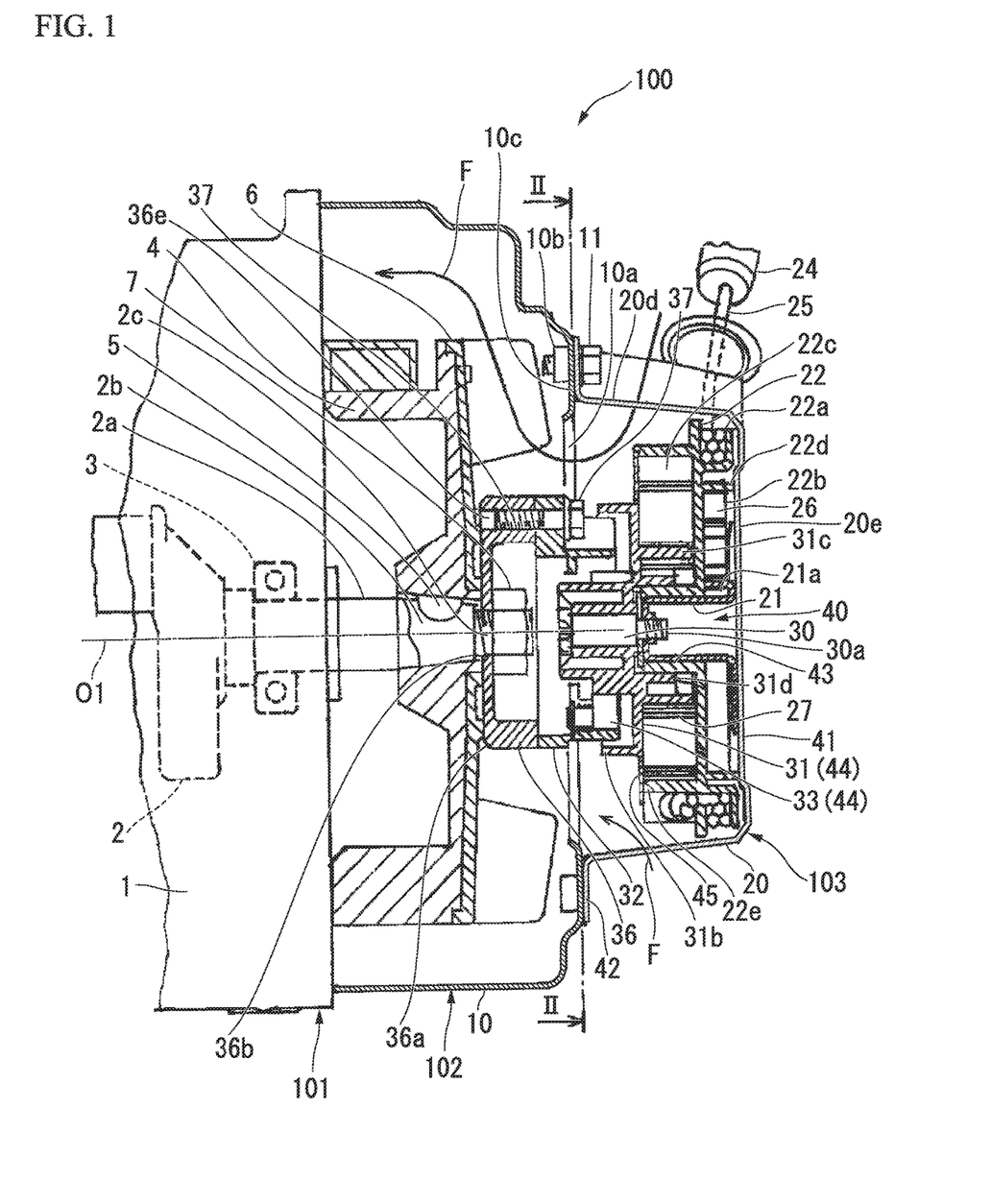
FIG. 1 is a cross-sectional view of a recoil starter of an engine in an embodiment of the present invention.

FIG. 1 is a cross-sectional view of a recoil starter of an engine according to an embodiment of the present invention.

As shown in FIG. 1, the engine 100 includes an engine body portion 101, a fan portion 102, and a recoil starter portion 103. The engine 100 of this embodiment is, for example, a general-purpose small air-cooled 4-cycle engine.

The engine body portion 101 is equipped with a fan-side crankshaft 2a. A base portion of the fan-side crankshaft 2a is connected to an end portion of the crankshaft 2. The fan-side crankshaft 2a protrudes from the crankcase 1 toward the fan portion 102 side.

The fan-side crankshaft 2a is rotatably supported by a bearing 3 provided inside the crankcase 1. A tapered portion 2b and a male threaded portion 2c are provided at the end portion of the fan-side crankshaft 2a on the side close to the fan portion 102 in an axial direction (hereinafter simply referred to as a direction of axis O1).

The male threaded portion 2c is formed at the end portion of the fan-side crankshaft 2a, and the tapered portion 2b is formed to be adjacent to the male threaded portion 2c on the base portion side of the fan-side crankshaft 2a. The tapered portion 2b is formed to be gradually reduced in diameter toward the end portion side. The male threaded portion 2c has a constant diameter, and screw threads are formed on the surface thereof.

The fan portion 102 includes a flywheel 4, a cooling fan 6, a spacer member 36, and a fan cover 10.

The flywheel 4 is attached to the fan-side crankshaft 2a. More specifically, the flywheel 4 is inserted into the tapered portion 2b of the fan-side crankshaft 2a in the state of being positioned at a predetermined angle by a half-moon key 5. The flywheel 4 is fixed to the fan-side crankshaft 2a by tightening of a nut 7 with respect to the male threaded portion 2c. The cooling fan 6 is integrally attached to the flywheel 4.

The cooling fan 6 is, for example, a centrifugal fan, and blows cooling air toward a cylinder (not shown) of the engine body portion 101. The cooling fan 6 is fixed on a surface of the flywheel 4 opposite to the engine body portion 101 in the direction of axis O1. That is, the cooling fan 6 rotates together with the flywheel 4. The spacer member 36 is disposed to be adjacent to the cooling fan 6 on the side opposite to the engine body portion 101 in the direction of axis O1.

The spacer member 36 transmits the rotation of a pulley 32 (to be described in detail below) of the recoil starter portion 103 to the fan-side crankshaft 2a, that is, the engine body portion 101. The spacer member 36 has a bottomed cylindrical shape. The spacer member 36 has a bolt hole 36b at the center of a bottom portion 36a in the bottomed cylindrical shape. The spacer member 36 is fastened to the fan-side crankshaft 2a together with the flywheel 4 and the cooling fan 6 by the nut 7, in a state in which the male threaded portion 2c of the fan-side crankshaft 2a is inserted into the bolt hole 36b, and the bottom portion 36a is in contact with the flywheel 4 and the cooling fan 6.

The fan cover 10 covers each of the above-described flywheel 4, the cooling fan 6, and the spacer member 36. The fan cover 10 is fixed to the crankcase 1 by fasteners (not shown) such as bolts. The fan cover 10 has a wall portion 10c extending in a direction perpendicular to the axis O1, on the side opposite to the engine body portion 101 in the direction of axis O1. An opening portion 10a is formed at the center of the wall portion 10c.

The pulley 32 of the recoil starter portion 103 is inserted through the opening portion 10a at the center thereof. The opening portion 10a is formed to have a sufficiently larger diameter than the pulley 32. A space is formed between the pulley 32 and the opening edge of the opening portion 10a, and this space serves as a flow path which supplies air to the cooling fan 6. On the wall portion 10c, a plurality of weld nuts 10b are attached to the peripheral edge of the opening portion 10a. The weld nuts 10b are attached to the inner surface of the wall portion 10c, and the plurality of weld nuts 10b are attached at intervals in the circumferential direction.

Figure 2:
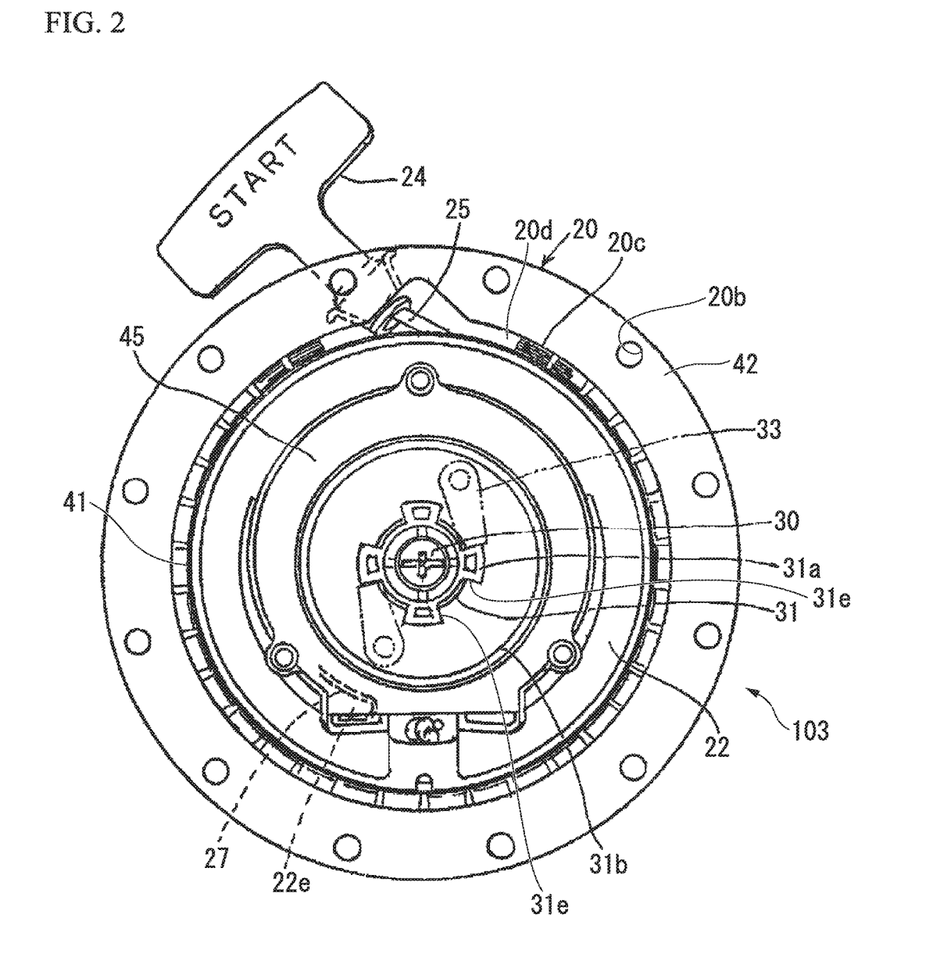
FIG. 2 is a cross-sectional view taken along line II-II of FIG. 1.

FIG. 2 is a cross-sectional view taken along line IT-II of FIG. 1.

As shown in FIGS. 1 and 2, the recoil starter portion 103 includes a reel case 20, and a starter body portion 40.

The reel case 20 forms an accommodation space which accommodates the starter body portion 40. The reel case 20 is attached to the above-described fan cover 10. The reel case 20 includes a case body portion 41 and a flange portion 42.

The case body portion 41 has a bottomed cylindrical shape having a central axis on the axis O1. A peripheral wall 20d of the case body portion 41 is gradually enlarged in diameter toward the engine body portion 101 in the direction of axis O1. The peripheral wall 20d includes a large number of ventilating holes 20c. These ventilating holes 20c are formed to introduce the cooling air from the outside.

The flange portion 42 is formed to extend radially outward from the end edge on the engine body portion 101 side of the case body portion 41. Further, the flange portion 42 is equipped with a bolt hole 20b (see FIG. 2) at a position opposite to the aforementioned weld nut 10b. The flange portion 42 is attached to the fan cover 10 by fastening a bolt 11 to the weld nut 10b in a state of abutting against the wall portion 10c of the fan cover 10.

That is, when the above-described cooling fan 6 operates, air is introduced into the reel case 20 via the ventilating holes 20c as indicated by an arrow F of FIG. 1. The air introduced into the reel case 20 reaches the cooling fan 6 through the space outside the pulley 32 and the spacer member 36, in the opening portion 10a of the fan cover 10. The air that has reached the cooling fan 6 is pushed to the outside in the centrifugal direction by the cooling fan 6, flows as cooling air in the direction of axis O1 through a flow path formed between the flywheel 4 and the fan cover 10, and is sent to the cylinder of the engine body portion 101.

As shown in FIG. 1, the starter body portion 40 includes a reel shaft 21, a pull rope reel 22, a pull rope 25, a ratchet mechanism 44, and the pulley 32.

The reel shaft 21 rotatably supports the pull rope reel 22. The reel shaft 21 has a cylindrical shape and fixed to the inner surface of a bottomed cylindrical bottom wall 20e of the reel case 20 by welding or the like. The axis of the reel shaft 21 is arranged on the axis O1.

The pull rope reel 22 has a cylindrical shape around which the pull rope 25 is wound. The pull rope reel 22 has a center hole 43 slightly larger than the reel shaft 21. By inserting the reel shaft 21 into the center hole 43, the pull rope reel 22 is freely rotatable around the reel shaft 21. The pull rope reel 22 includes a rope groove 22a, and spring chambers 22b and 22c.

The rope groove 22a is formed at the end portion of the pull rope reel 22, on the outer side in the radial direction and on the side close to the bottom wall 20e of the reel case 20 in the direction of axis O1. The pull rope 25 is wound and accommodated inside the rope groove 22a. A starter grip 24 is attached to a first end portion of the pull rope 25, and a second end portion of the pull rope 25 is fixed to the inside of the rope groove 22a.

The starter grip 24 is disposed outside the reel case 20.

The spring chamber 22b accommodates a recoil spring (spiral spring) 26. The spring chamber 22c accommodates a damper spring (spiral spring) 27. The spring chambers 22b and 22c are disposed radially inward of the rope groove 22a. Further, the spring chambers 22b and 22c are formed in the order of the spring chambers 22c and 22b from the engine body portion 101 side in the direction of the axis O1.

The recoil spring 26 urges the rotation of the pull rope reel 22 in a direction in which the pull rope 25 is wound. Both ends of the recoil spring 26 are bent, for example, in a hook shape. An outer end of both ends of the recoil spring 26 is hooked on a spring receiving portion 22d provided on the pull rope reel 22, and an inner end of both ends of the recoil spring 26 is hooked on a spring receiving portion 21a provided on the reel shaft 21.

The damper spring 27 accumulates the rotational force of the pull rope reel 22 and transmits the rotational force to a ratchet wheel 31 to be described below. Both ends of the damper spring 27 are bent in a hook shape, for example, similarly to the recoil spring 26. An outer end of both ends of the damper spring 27 is hooked on a spring receiving portion 22e provided on the pull rope reel 22, and an inner end of both ends of the damper spring 27 is hooked on a spring receiving portion 31c of the ratchet wheel 31 to be described below.

An extension shaft 30 is attached to the tip of the above-mentioned reel shaft 21. The extension shaft 30 extends the reel shaft 21 to the engine body portion 101 side in the direction of axis O1. A male thread 30a is formed on the extension shaft 30. When the male thread 30a is screwed into a female thread formed in the tip of the reel shaft 21, the extension shaft 30 is fixed to the reel shaft 21. The extension shaft 30 is inserted into the ratchet wheel 31 of the ratchet mechanism 44 in the direction of axis O1 to rotatably support the ratchet wheel 31.

The ratchet mechanism 44 transmits the rotational force of the pull rope reel 22 to the spacer member 36 only when the engine is started. The ratchet mechanism 44 includes the ratchet wheel 31 and a ratchet pawl 33.

The ratchet wheel 31 rotates with the rotation of the pull rope reel 22. The ratchet wheel 31 includes a shielding cylinder 31b, a cylinder 31d, and a protruding part 31a (see FIG. 2).

As shown in FIGS. 1 and 2, the shielding cylinder 31b covers part of the pulley 32 on the pull rope reel 22 side in the direction of axis O1 from the outer side in the radial direction. The shielding cylinder 31b forms a meandering gap between the shielding cylinder 31b and an outer peripheral wall of the pulley 32. Due to the meandering gap, the entry of dust, rainwater, or the like from the ventilating hole 20c is suppressed.

The cylinder 31d has the aforementioned spring receiving portion 31c. The cylinder 31d is disposed radially inward of the shielding cylinder 31b. More specifically, the spring receiving portion 31c of the cylinder 31d is formed at the radially inner position of the spring chamber 22c of the pull rope reel 22 so as to enter the pull rope reel 22 from the engine body portion 101 side along the axis O1.

As shown in FIG. 2, a plurality of protruding parts 31a are formed at the end portion of the ratchet wheel 31 on the engine body portion 101 side. The protruding parts 31a protrude toward the outer side in the radial direction, in other words, toward the radially outer side. In this embodiment, the protruding parts 31a are disposed at equal intervals in the circumferential direction of the ratchet wheel 31, more specifically, at intervals of 90°. The protruding parts 31a each have surfaces 31e facing both sides in the circumferential direction.

Figure 3:
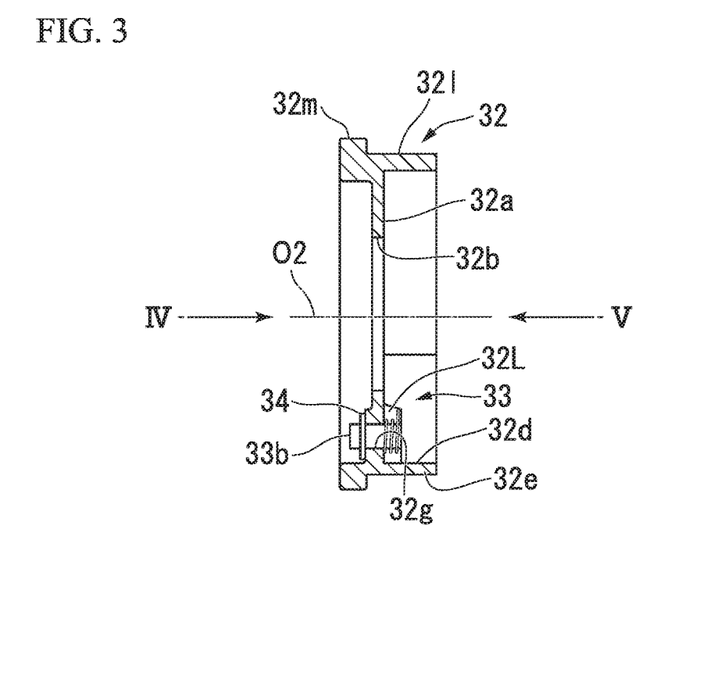
FIG. 3 is a cross-sectional view of a pulley in an embodiment of the present invention.

FIG. 3 is a cross-sectional view of the pulley in the embodiment of the present invention.

Figure 4:
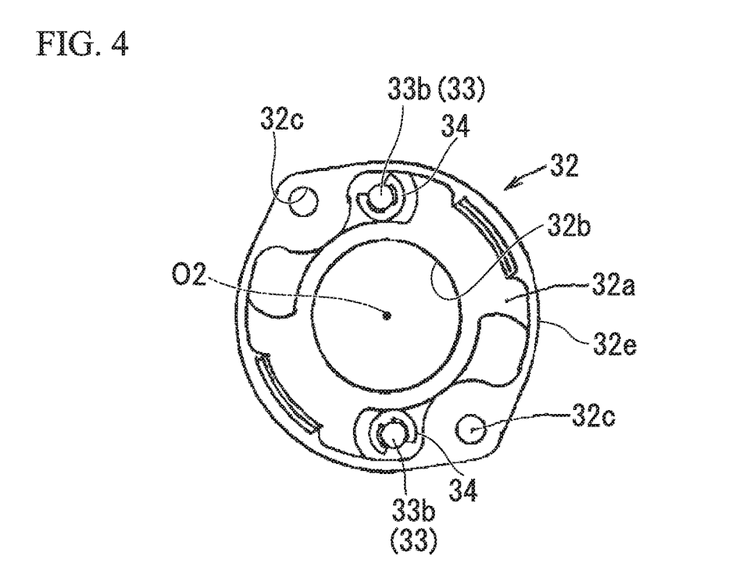
FIG. 4 is a diagram of the pulley in FIG. 3 as viewed from the arrow IV.
Figure 5:
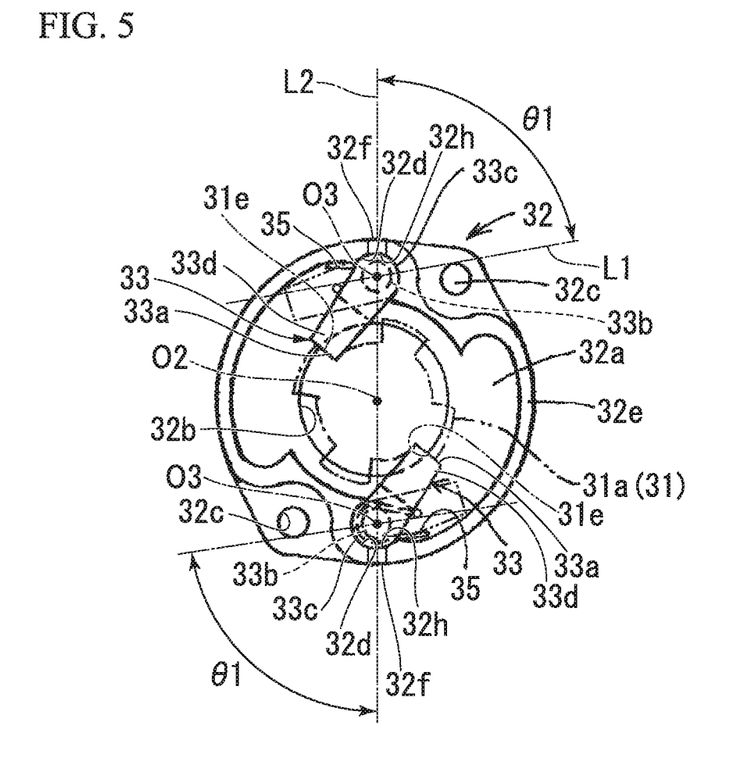
FIG. 5 is a diagram of the pulley in FIG. 3 as viewed from the arrow V.

FIG. 4 is a diagram of the pulley in FIG. 3 as viewed from the arrow IV. FIG. 5 is a diagram of the pulley in FIG. 3 as viewed from arrow V.

As shown in FIG. 5, a base end portion 33c of the ratchet pawl 33 is rotatably supported on the radially outer side of the ratchet wheel 31. As a result, the ratchet pawl 33 is able to swing. The ratchet pawl 33 is formed to be slightly tapered toward the tip portion.

A plane 33a perpendicular to the extending direction of the ratchet pawl 33 is formed at the tip portion 33d of the ratchet pawl 33. The base end portion 33c of the ratchet pawl 33 has an arc shape centered on a swinging axis (hereinafter simply referred to as an axis O3) around which the ratchet pawl 33 swings. In this embodiment, two ratchet pawls 33 are provided and are attached at symmetrical positions with respect to the axis O2 which is the rotation center of the pulley 32, respectively.

The ratchet pawl 33 is able to swing between an engaged position (indicated by a solid line in FIG. 5) where the ratchet pawl engages with the protruding part 31a of the ratchet wheel 31 and a disengaged position (indicated by a two-dot chain line in FIG. 5) where the ratchet pawl does not engage with the protruding part 31a. The ratchet pawl 33 is always urged toward the engaged position by torsion springs 35 mounted around pins 33b constituting a swinging shaft. The spring constant of the torsion spring 35 is set to such a degree that the ratchet pawl 33 can be displaced to the disengaged position by centrifugal force after the engine is started.

As shown in FIGS. 4 and 5, the pulley 32 includes a partition wall 32a, a bolt hole 32c, and an outer wall 32e.

A hole 32b is formed in the central part of the partition wall 32a. The hole 32b passes through the end portion of the ratchet wheel 31 on the engine body portion 101 side. The protruding part 31a of the ratchet wheel 31 is disposed on the side closer to the pull rope reel 22 than the partition wall 32a. A bearing hole 32g (see FIG. 3) which supports the above-described ratchet pawl 33 in a swingable manner is formed in the partition wall 32a. The pin 33b forming the swinging shaft of the ratchet pawl 33 passes through the bearing hole 32g, and a C-shaped retaining ring 34 is attached to an end portion thereof.

The outer wall 32e has a cylindrical shape to extend from the peripheral edge of the partition wall 32a to both sides in the axial direction. The outer wall 32e has an outer wall body 32l extending toward the ratchet pawl 33 from the partition wall 32a in the direction of the axis O2, and a large-diameter portion 32m extending toward the engine body portion 101 side from the partition wall 32a. The large-diameter portion 32m has a larger diameter than the outer wall body 32l, and is formed to be shorter than the partition wall 32a in the direction of the axis O2.

Further, the outer wall 32e has a support surface 32d. When the ratchet pawl 33 is in the engaged position (indicated by a solid line in FIG. 5), the support surface 32d supports the base end portion 33c of the ratchet pawl 33 from the side opposite to the tip portion 33d of the ratchet pawl 33 across the pin 33b of the ratchet pawl 33. The support surface 32d has a circular arc shape when viewed in a cross-sectional view perpendicular to the axis O3 of the pin 33b, and an end surface having an arcuate cross section of the base end portion 33c of the ratchet pawl 33 comes into sliding contact with the support surface 32d. By forming the support surface 32d, it is possible for the ratchet pawl 33 and the pin 33b to receive the reaction force received from the ratchet wheel 31 on the support surface 32d.

Here, the plane 33a of the tip portion 33d of the ratchet pawl 33 located at the engaged position butts against the surface 31e of the protruding part 31a facing the rotation direction (indicated by an arrow in FIG. 5). In other words, the ratchet pawl 33 located at the engaged position is in a state in which the plane 33a extends radially inward from the base end portion 33c at an angle facing the surface 31e of the protruding part 31a.

The outer wall 32e has a foreign matter discharge portion 32f through which the internal space of the pulley 32 on which the ratchet pawl 33 is disposed communicates with the external section of the pulley 32. The foreign matter discharge portion 32f is provided to discharge foreign matter such as sand grains contained in the cooling air to the outside of the pulley 32.

The foreign matter discharge portion 32f is formed by penetrating the outer wall 32e in its thickness direction. In the foreign matter discharge portion 32f in this embodiment, an opening portion 32h on the internal space side is formed in the support surface 32d, and the penetration direction thereof is the radial direction of the pulley 32, that is, the centrifugal direction.

The foreign matter discharge portion 32f of this embodiment is formed such that at least part of the opening portion 32h of the foreign matter discharge portion 32f is disposed in an angle range θ1 in the support surface 32d between a straight line L1 passing through the center of the ratchet pawl 33 located at the disengaged position and a straight line L2 passing through the axis (rotation axis) O2 of the pulley 32 and the swinging axis O3 of the ratchet pawl 33.

Figure 6:
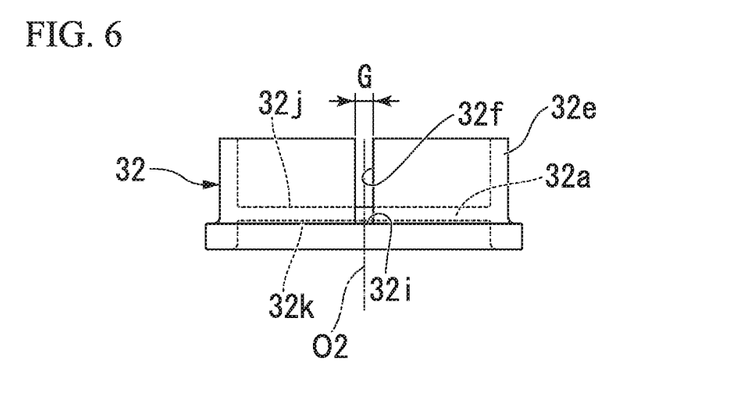
FIG. 6 is a side view of a pulley in an embodiment of the present invention.

FIG. 6 is a side view of the pulley in the embodiment of the present invention.

As shown in FIG. 6, the foreign matter discharge portion 32f has a slit shape. More specifically, the foreign matter discharge portion 32f extends from the end edge of the outer wall 32e toward the partition wall 32a along the axis O2 of the pulley 32. An end portion 32i of the foreign matter discharge portion 32f on the partition wall 32a side reaches a position slightly closer to an outer surface 32k of the partition wall 32a than an inner surface 32j of the partition wall 32a of the side close to the pull rope reel 22, that is, a position close to the engine body portion 101. It is preferable that the width dimension of the foreign matter discharge portion 32f in the circumferential direction, in other words, a slit width G, be formed as large as possible within a range in which the support strength against the ratchet pawl 33 can be ensured.

Next, the operation of the above-described recoil starter will be described.

First, in a state in which the driving of the engine 100 is completely stopped, the ratchet pawl 33 is disposed at the engaged position. In this state, the user grasps the starter grip 24 and pulls the starter grip 24 greatly and quickly in a linear manner. Then, the pull rope 25 wound around the pull rope reel 22 is pulled out, and the pull rope reel 22 rotates. By the rotation of the pull rope reel 22, the recoil spring 26 and the damper spring 27 are wound up. The damper spring 27 transmits the rotation to the ratchet wheel 31, while being compressed.

The ratchet wheel 31, to which the rotation of the pull rope reel 22 is transmitted via the damper spring 27, presses the tip portion 33d of the ratchet pawl 33 in the rotation direction by its protruding part 31a. Then, a force in the rotational direction acts on each of the support surface 32d of the base end portion 33c of the ratchet pawl 33 and the pin 33b, and the pulley 32 supporting the ratchet pawl 33 rotates together with the ratchet wheel 31. Due to the rotation of the pulley 32, each of the spacer member 36, the cooling fan 6, the flywheel 4, and the fan-side crankshaft 2a fixed integrally with the pulley 32 starts to rotate, and cranking is performed. As a result, the engine 100 is started.

When the rotation speed of the pulley 32 exceeds the rotation speed of the ratchet wheel 31, the ratchet mechanism 44 allows relative rotation of the pulley 32 with respect to the ratchet wheel 31. This is because the ratchet pawl 33 is pushed from the radially inner side by the protruding part 31a located on the opposite side in the circumferential direction to the facing direction of the plane 33a, and the ratchet pawl 33 swings to move over the protruding part 31a.

When the engine 100 starts and enters steady operation, the ratchet pawl 33 swings to the disengaged position by centrifugal force, the engaged state with the ratchet wheel 31 is released, and the ratchet pawl 33 does not come into contact with the protruding part 31a. When the engine 100 is steadily operating in this way, centrifugal force due to the rotation of the pulley 32 always acts on the ratchet pawl 33. Therefore, the ratchet pawl 33 is held at the disengaged position against the urging force due to the torsion spring 35.

When the ignition of the engine 100 is stopped, the crankshaft 2 first tries to maintain its rotation by an inertial force of the crankshaft 2 and the components and the like connected to the crankshaft 2. However, since a resistance force due to friction of the piston or the like occurs by each step in stroke of exhaust, suction, compression, and expansion (no ignition) of the engine, the resistance force gradually reduces the rotation of the crankshaft 2. With the reduction in the rotation of the crankshaft 2, the centrifugal force acting on the ratchet pawl 33 supported by the pulley 32 decreases. Therefore, in the state in which the ratchet pawl 33 gradually swings from the disengaged position to the engaged position and the rotation of the crankshaft 2 is completely stopped, the ratchet pawl 33 engages with the protruding part of the ratchet wheel 31.

According to the above-described embodiment, even when foreign matter such as sand grains contained in the cooling air for the engine 100 enters the internal space of the pulley 32, the foreign matter entering the internal space of the pulley 32 can be discharged to the external space of the pulley 32 via the foreign matter discharge portion 32f by the centrifugal force due to the rotation of the pulley 32. Therefore, it is possible to suppress the foreign matter from entering, for example, the gap between the torsion spring 35 and the pin 33b for urging the ratchet pawl 33 by the torsion spring 35 or the gap between the base end portion 33c of the ratchet pawl 33 and the support surface 32d, and from being caught in the gap. As a result, it is possible to suppress the malfunction of the ratchet pawl 33 and to reduce the frequency of maintenance such as disassembly and cleaning.

Furthermore, since the opening portion 32h of the foreign matter discharge portion 32f is formed in the support surface 32d, even when the foreign matter enters the gap between the ratchet pawl 33 and the support surface 32d, the foreign matter entering this gap can be discharged to the outside of the pulley 32 via the opening portion 32h of the foreign matter discharge portion 32f formed in the support surface 32d. As a result, it is possible to prevent the occurrence of catching caused by foreign matter entering between the ratchet pawl 33 and the support surface 32d, and to further reduce the maintenance frequency.

Further, since the foreign matter discharge portion 32f is formed to penetrate in the radial direction around the axis O2 of the pulley 32, the direction of the centrifugal force exerted by the rotation of the pulley 32 and the direction of the penetration of the foreign matter discharge portion 32f can be made to coincide with each other. As a result, the foreign matter can be smoothly discharged to the outside of the pulley 32 by centrifugal force.

Further, since the foreign matter discharge portion 32f has a slit shape, it is possible to discharge foreign matter in a wide range of the rotation axis direction of the pulley 32. As a result, it is possible to reduce the foreign matter remaining in the internal space of the pulley 32.

In addition, as shown in FIG. 3, it is also possible to suppress the deposition and entry of dust into a pawl attachment portion 32L that is a space around the pin 33b for accommodating the torsion spring 35. Therefore, it is possible to suppress hindering of the swinging of the ratchet pawl 33 caused by the entry of dust into the pawl attachment portion 32L.

Further, since the foreign matter discharge portion 32f extends to the outside of the ratchet pawl 33 in the direction of the axis O2 of the pulley 32, the opening portion 32h of the foreign matter discharge portion 32f is formed in the entire region of the region in which the ratchet pawl 33 is present in the direction of the axis O2 of the pulley 32. As a result, it is possible to further suppress the foreign matter from remaining in the gap between the ratchet pawl 33 and the support surface 32d.

Furthermore, since the engine 100 includes the recoil starter portion 103, it is possible to suppress the situation in which the engine 100 cannot be started due to malfunction of the recoil starter portion 103. As a result, the reliability of the engine 100 can be improved.

The present invention is not limited to the above-described embodiments, and includes various modifications to the above-described embodiments within the scope not departing from the gist of the present invention. That is, the specific shapes, configurations, and the like described in the embodiments are merely examples, and can be appropriately changed.

As shown in FIG. 5, in the aforementioned embodiment, the case where the ratchet wheel 31 rotates in the clockwise direction and the crankshaft 2 also rotates in the same direction has been described. However, the direction of rotation of the ratchet wheel 31 and the crankshaft 2 is not limited to the clockwise direction and may be a counterclockwise direction. In this way, when the ratchet wheel 31 and the crankshaft 2 rotate in the counterclockwise direction, the shape of the pulley 32 may be reversed on the left and right sides.

In the aforementioned embodiment, the case where the foreign matter discharge portion 32f penetrates in the radial direction of the pulley 32 has been described. However, as long as foreign matter can be discharged by centrifugal force, the penetration direction of the foreign matter discharge portion 32f is not limited to the radial direction. Further, the opening portion 32h of the foreign matter discharge portion 32f may be disposed at a position other than the support surface 32d. Further, a plurality of foreign matter discharge portions 32f may be provided so that the opening portion 32h of any one foreign matter discharge portion 32f is disposed in the support surface 32d.

In the above-described embodiment, the case where four protruding parts 31a are provided has been described, but three or less, or five or more protruding parts 31a may be provided.

Figure 7:
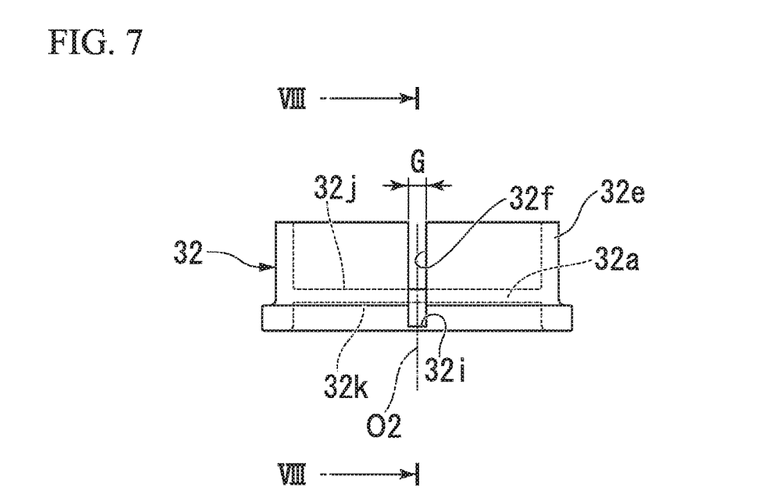
FIG. 7 is a diagram corresponding to FIG. 6 in a first modified example of the embodiment of the present invention.
Figure 8:
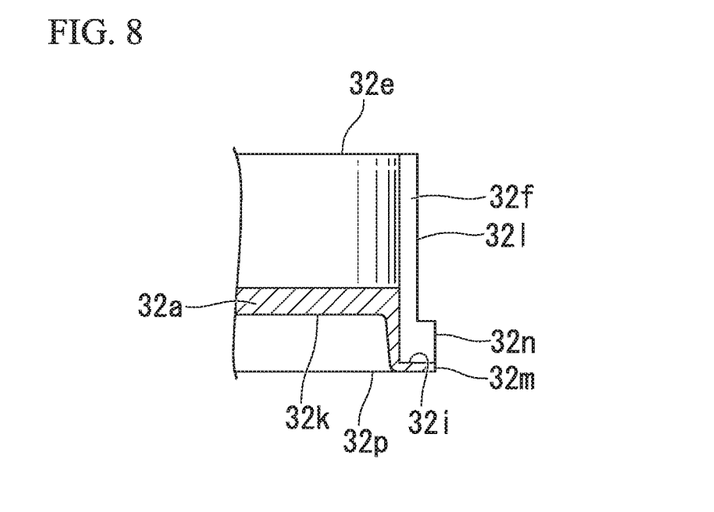
FIG. 8 is a partial cross-sectional view taken along the line VIII-VIII of FIG. 7.

FIG. 7 is a diagram corresponding to FIG. 6 in a first modified example of the embodiment of the present invention. FIG. 8 is a partial cross-sectional view taken along line VIII-VIII of FIG. 7.

In the aforementioned embodiment, the description has been given of a case where the foreign matter discharge portion 32f extends from the end edge of the outer wall 32e toward the partition wall 32a side along the axis O2, and the end portion 32i thereof reaches the side slightly closer to the outer surface 32k of the partition wall 32a than the inner surface 32j of the partition wall 32a on the engine body portion 101 side.

However, the shape of the foreign matter discharge portion 32f is not limited to this shape. For example, as in the modified example shown in FIGS. 7 and 8, the foreign matter discharge portion 32f may extend to the vicinity of an end edge 32p of the partition wall 32a. With such a configuration, since the discharge port of the foreign matter discharge portion 32f is enlarged, the discharge effect of dust or the like can be further improved.

In the first modified example shown in FIGS. 7 and 8, the case where the foreign matter discharge portion 32f extends to the vicinity of the end edge 32p of the partition wall 32a has been described. However, the foreign matter discharge portion 32f may further extend to the engine body portion 101 side, and the outer wall body 32l and the large-diameter portion 32m may be formed in a slit shape penetrating along the axis O2.

Figure 9:
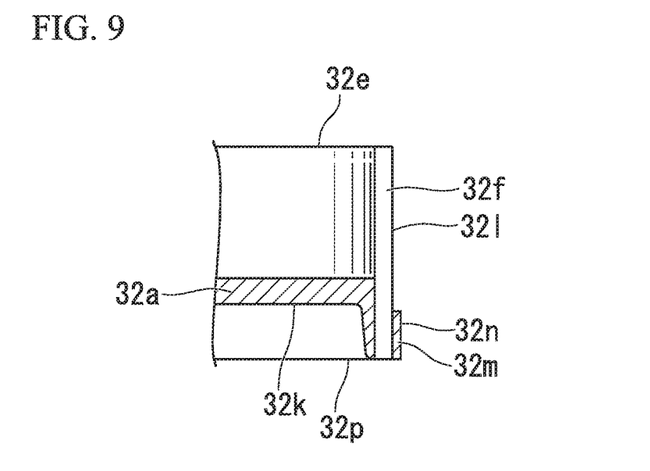
FIG. 9 is a partial cross-sectional view corresponding to FIG. 8 in a second modified example of the embodiment of the present invention.

FIG. 9 is a partial cross-sectional view corresponding to FIG. 8 in a second modified example of the embodiment of the present invention.

Further, in the case of forming the foreign matter discharge portion 32f to penetrate the outer wall body 32l and the large-diameter portion 32m along the axis O2, as in the second modified example shown in FIG. 9, the foreign matter discharge portion 32f may be formed to penetrate radially inward of an outer peripheral surface 32n of the large-diameter portion 32m in the direction of the axis O2.

Figure 10:
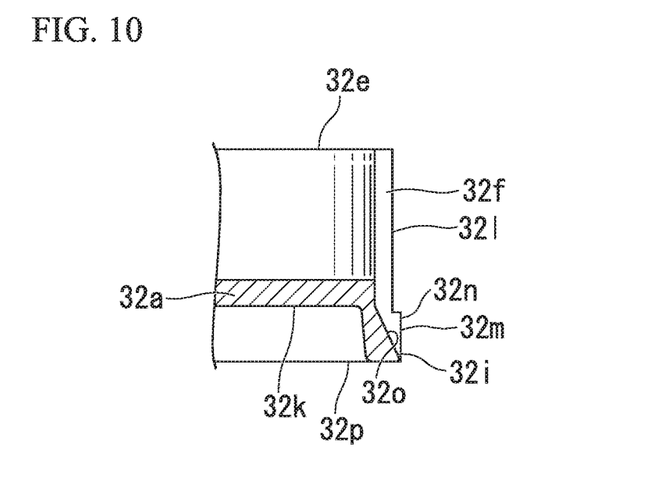
FIG. 10 is a partial cross-sectional view corresponding to FIG. 8 in a third modified example of the embodiment of the present invention.

FIG. 10 is a partial cross-sectional view corresponding to FIG. 8 in a third modified example of the embodiment of the present invention.

In the first modified example shown in FIG. 8, the case where the end portion 32i of the foreign matter discharge portion 32f is formed in a plane extending in a direction intersecting with the axis O2 has been described. However, a tapered surface 32o may be formed at the end portion 32i. Although a case where the tapered surface 32o shown in FIG. 10 is a plane is shown, the tapered surface 32o may be a concave surface, a convex surface, or the like.

Furthermore, in the above-described embodiment and the respective modified examples, the case where the foreign matter discharge portion 32f has a straight slit shape when the pulley 32 is viewed from the radially outer side has been described.

However, the shape of the foreign matter discharge portion 32f is not limited to this shape. For example, the shape may have a shape other than a slit such as a round hole or an elongated hole.

INDUSTRIAL APPLICABILITY

The present invention can be applied to a recoil starter and an engine, and it is possible to reduce the frequency of maintenance such as disassembly and cleaning.

REFERENCE SIGNS LIST

1 Crankcase
2 Crankshaft
2a Fan-side crankshaft
2b Tapered portion
2c Male threaded portion
3 Bearing
4 Flywheel
5 Half-moon key
6 Cooling fan
7 Nut
10 Fan cover
10a Opening portion
10b Weld nut
10c Wall portion
11 Bolt
20 Reel case
20b Bolt hole
20c Ventilating hole
20d Peripheral wall
20e Bottom wall
21 Reel shaft
22 Pull rope reel
22a Rope groove
22b Spring chamber
22c Spring chamber
22d Spring receiving portion
22e Spring receiving portion
24 Starter grip
25 Pull rope
26 Recoil spring
27 Damper spring
30 Extension shaft
30a Male thread
31 Ratchet wheel
31a Protruding part
31c Spring receiving portion
31d Cylinder
31e Surface
32 Pulley
32a Partition wall
32b Hole 32c Bolt hole
32d Support surface
32e Outer wall
32f Foreign matter discharge portion
32g Bearing hole
32h Opening portion
32i End portion
32j Inner surface
32k Outer surface
32l Outer wall body
32m Large-diameter portion
32n Outer circumferential surface
32o Tapered surface
32p End edge
33 Ratchet pawl
33a Plane
33b Pin
33c Base end portion
33d Tip portion
34 C-shaped retaining ring
35 Torsion spring
36 Spacer member
40 Starter body portion
41 Case body portion
42 Flange portion
43 Center hole
44 Ratchet mechanism
100 Engine
101 Engine body portion
102 Fan portion
103 Recoil starter portion
O1 axis
O2 axis

What is claimed is:

1. A recoil starter comprising:
a pull rope reel around which a pull rope is wound, the pull rope reel rotating by pulling out the pull rope;
a ratchet wheel which is configured to rotate with the rotation of the pull rope reel and has a protruding part protruding toward a radially outer side of a rotation axis;
a pulley rotatable coaxially with the ratchet wheel;
a ratchet pawl which is supported on the pulley on the radially outer side of the ratchet wheel, is capable of swinging between an engaged position where the ratchet pawl engages with the protruding part and a disengaged position where the ratchet pawl does not engage with the protruding part, and is always urged toward the engaged position; and
an outer wall which is provided on the pulley, has a support surface which supports a base end portion of the ratchet pawl from a side opposite to the tip portion of the ratchet pawl across a swinging axis of the ratchet pawl when the ratchet pawl is in the engagement position, and has a foreign matter discharge portion through which the internal space of the pulley on which the ratchet pawl is disposed communicates with the external space of the pulley,
wherein an opening portion on the internal space side of the foreign matter discharge portion is formed in at least the support surface.

2. The recoil starter according to claim 1, wherein the opening portion is formed in an angular range of the support surface between a straight line passing through the center of the ratchet pawl in the disengaged position and a straight line passing through the rotation axis of the pulley and the swinging axis of the ratchet pawl.

3. The recoil starter according to claim 1, wherein the foreign matter discharge portion is formed by penetrating the pulley in a radial direction around a rotation axis of the pulley.

4. The recoil starter according to claim 1, wherein the foreign matter discharging portion has a slit shape extending in the rotation axis direction of the pulley.

5. The recoil starter according to claim 1, wherein the foreign matter discharging portion extends to the outside of the ratchet pawl in the rotation axis direction of the pulley.

6. An engine comprising the recoil starter according to claim 1.

7. The recoil starter according to claim 2, wherein the foreign matter discharge portion is formed by penetrating the pulley in a radial direction around a rotation axis of the pulley.

8. The recoil starter according to claim 2, wherein the foreign matter discharging portion has a slit shape extending in the rotation axis direction of the pulley.

9. The recoil starter according to claim 3, wherein the foreign matter discharging portion has a slit shape extending in the rotation axis direction of the pulley.

10. The recoil starter according to claim 2, wherein the foreign matter discharging portion extends to the outside of the ratchet pawl in the rotation axis direction of the pulley.

11. The recoil starter according to claim 3, wherein the foreign matter discharging portion extends to the outside of the ratchet pawl in the rotation axis direction of the pulley.

12. The recoil starter according to claim 4, wherein the foreign matter discharging portion extends to the outside of the ratchet pawl in the rotation axis direction of the pulley.

13. An engine comprising the recoil starter according to claim 2.

14. An engine comprising the recoil starter according to claim 3.

15. An engine comprising the recoil starter according to claim 4.

16. An engine comprising the recoil starter according to claim 5.

* * * * *